Nov. 3, 1959 — R. N. FALGE ET AL — 2,911,523
HEADLAMP ADJUSTER

Filed May 13, 1957 — 2 Sheets-Sheet 1

INVENTORS
Robert N. Falge,
Gerald R. Broshar &
Ray Manning
BY R. T. Barnard
ATTORNEY Nov. 3, 1959 R. N. FALGE ET AL 2,911,523
HEADLAMP ADJUSTER
Filed May 13, 1957 2 Sheets-Sheet 2

INVENTORS
Robert N. Falge
Gerald R. Brosher
Ray Manning
BY
R. J. Barnard
ATTORNEY

United States Patent Office 2,911,523
Patented Nov. 3, 1959

2,911,523

HEADLAMP ADJUSTER

Robert N. Falge, Gerald R. Broshar, and Ray Manning, Anderson, Ind., assignors to General Motors Corporation, Detroit, Mich., a corporation of Delaware Application May 13, 1957, Serial No. 658,777

15 Claims. (Cl. 240—41.6)

The present invention relates to an adjusting or aiming mechanism for a headlamp assembly commonly known as the ball and socket type, and is an improvement in the mechanism disclosed in the copending application of Robert N. Falge and Raymond A. Gaither, Serial No. 658,858, filed May 13, 1957. More specifically, the present invention relates to primary and secondary adjusting or aiming means for the beam of such an assembly, the secondary aiming or adjusting means being operative to aim the headlamp beam to a predetermined fixed extent irrespective of the adjusted position of the primary means and without disturbing the latter's adjustment.

Almost all, if not all, major manufacturers of headlamp assemblies now utilize what may be termed a ball and socket mounting. Such an assembly and mounting is typically depicted in the patent to Howard C. Mead and Robert D. Winkelmeyer No. 2,266,329. Such mountings typically include a ball member universally adjustably mounted in a socket member formed on a supporting housing located within a vehicle fender. The ball member forms a sub-assembly usually including a sealed beam headlamp unit operatively clamped between a retaining ring and a mounting ring, the latter being in adjustable universal bearing engagement with the socket member. The ball member includes a sealed lens, reflector and light unit or bulb fixedly mounted within the unit relative to the reflector. Thus, the aforementioned various components of the sealed beam unit are at all times in a fixed relation relative to each other thereby facilitating the design of the lens to provide optimum beam patterns.

As taught in this art, spring means and aiming screws are circumferentially spaced about the assembly and operatively interconnected between the ball and socket members for adjustably mounting the ball member within the socket member. It is usual practice to provide at least two aiming screws mounted respectively on the horizontal and vertical axis of the assembly for cooperation with the spring means for universally adjusting the ball member.

A serious problem has developed with the use of these and other headlamp assemblies with heavy vehicles, particularly those including a tractor drawing a semi-trailer. For example, the aiming screws may be adjusted to provide the desired headlamp aim according to State established standards, but thereafter this aim may be seriously disrupted by loading of the vehicle. As an illustration, when the tractor alone is used, the headlamp beam may be adjusted to the required setting. When a semi-trailer is then attached to such a tractor, the latter in effect pivots about its rear axle, resulting in upward projection of the headlamp beam to an undesired blinding and illegal extent. Furthermore, as the trailer is loaded this condition is further accentuated.

As a practical illustration of this undesirable situation, tests have been run on various types of track tractors and semi-trailers to determine the degree in which headlamp aim is disrupted by the loaded and unloaded conditions, and where the tractor is detached from the trailer. In one type of tractor-trailer combination which was to be loaded with ten tons, the headlamp assembly was adjusted to a reference point. As a matter of fact, this reference point was selected as one in which there was no aim upwardly or downwardly from the horizontal when the tractor-trailer combination was loaded. Upon unloading the trailer, the headlamp beam was then downaimed five inches. After the trailer was detached from the tractor, the down-aim increased to eleven inches.

In another manufacturer's truck having a trailer attached thereto, the vehicle was loaded with fifteen tons. The headlamps were aimed to the reference point. When the vehicle was unloaded, a two inch down-aim occurred, and when the trailer was detached this down-aim increased to a little more than four inches.

As aforementioned, all of the various States have regulations governing the maximum extent to which headlamp beams are to be aimed upwardly in a vertical plane. From the examples cited above, it will be readily appreciated that the required setting will not always be obtained. Moreover, in the examples cited above, the headlamps were initially adjusted with the vehicle under load so that as the vehicles were unloaded only down-aim would occur. It will be readily appreciated that it often happens that the headlamps are initially adjusted on the tractor without the trailer or any other load being attached or imposed thereon. Thus, upon attaching the trailer and loading the latter, an extreme degree of upward aim occurs which, of course, is very dangerous to the drivers of oncoming vehicles and a violation of the aforementioned regulations.

It is intended, therefore, within the scope of this invention to provide an aiming device for vehicles of the general class described in which the aim of the headlamp may be selectively adjusted to compensate for various loaded conditions of the vehicle. More particularly, it is intended to provide a headlamp assembly of the type aforementioned with a primary aiming means to initially set the headlamp beam, and a secondary aiming means selectively operable to establish a desired degree of downaim after the vehicle is loaded.

Moreover, within the scope of this invention, the aforementioned primary and secondary aiming means are so constructed and arranged that the secondary aiming means may be actuated irrespective of and without disturbing the setting of the primary aiming means, whereby, at any desired time, the initially established headlamp aim may be obtained.

Referring now to the drawings.

Figure 1:
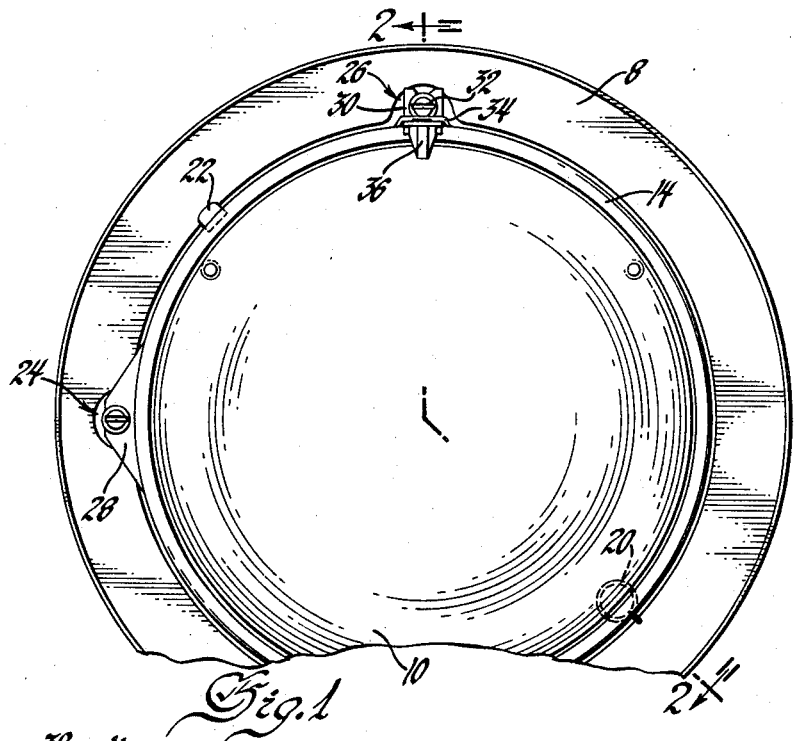
Figure 1 is a front elevation of the headlamp assembly.

In the drawings, there is disclosed a ball and socket headlamp assembly comprising a ball or sub-assembly member 2 adapted to be universally adjustably mounted in a supporting housing 4 located within a vehicle fender. The supporting housing 4 includes an annular rolled rim 6 surrounded by a circumferentially extending channel 8.

The ball member 2 includes a sealed beam headlamp unit 9 comprising the usual lens 10 and a lighting unit, not shown, fixedly secured relative to a reflector, also not shown. The design of the sealed beam unit 2 is such that the lighting unit is located in the desired position on the axis of the sealed beam unit relative to the reflector and optic design of the lens 10 to provide the desired beam patterns.

The ball member 2 further includes an annular retaining ring 12 having an inwardly turned lip 14 engaging an annular flange on the sealed beam unit. The sealed beam unit is seated in a mounting ring 16 having a plurality of spherical bearing surfaces 18 adjustably seated on the rolled rim or socket member 6 of the support housing 4. The sealed beam unit is effectively clamped between the retaining ring and mounting ring by means of a resilient spring 20 grounded within the annular channel 8 of the support housing 4 and operatively connected in any suitable manner to the retaining ring 12. Moreover, a spring clip 22 is carried by the mounting ring and projects through a suitable aperture in the retaining ring 12 at a point preferably diametrically opposite from the spring 20.

The aiming means 24 and 26 are circumferentially spaced from the spring 20 and spring clip 22 and are preferably located, respectively, on the horizontal and vertical axes of the headlamp assembly.

It is customary that each aiming mechanism include a bracket suitably located within the annular channel 8 of the support housing to carry an aiming nut into which there is threadably secured an aiming screw secured to a slotted mounting ring flange. Thus, in the conventional structure described, the aiming screws may be selectively adjusted to universally adjust the ball member 2 within the housing 4 at the points of bearing between the rolled rim 6 and mounting ring 16.

Figure 2:
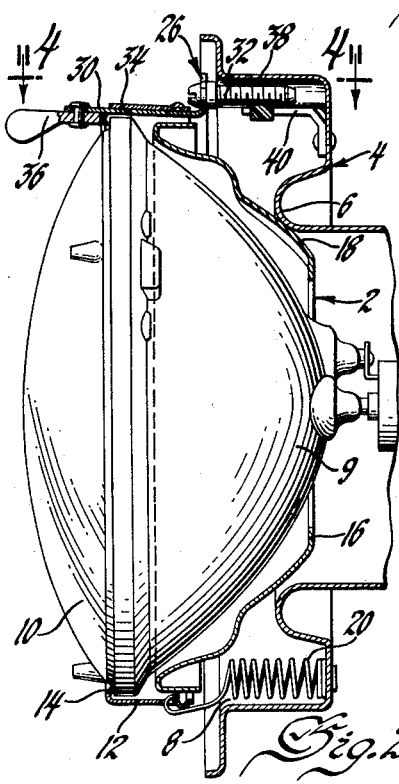
Figure 2 is a cross section taken on line 2—2 of Figure 1 and shows a preferred embodiment of this invention.
Figure 3:
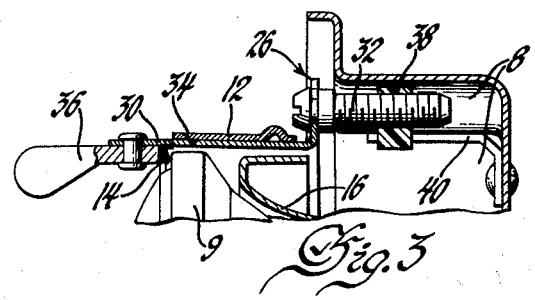
Figure 3 is an enlarged fragmentary view of the aiming mechanism of Figure 2.
Figure 4:
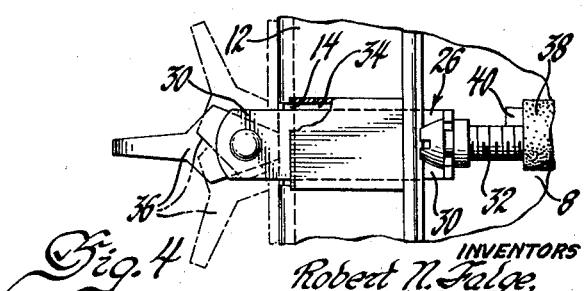
Figure 4 is a top plan view corresponding to Figure 3.

To provide a secondary aiming means which may be selectively manually actuated to provide a desired degree of down-aim upon loading of the vehicle, the aiming mechanism 26 located on the vertical axis of the assembly is preferably modified as shown in Figs. 2 through 4.

In this construction, the usual slotted mounting ring flange or ear, corresponding to the flange 28 associated with aiming mechanism 24, has been cut off in mechanism 26. A strap 30 is fixedly secured adjacent the head of the aiming screw 32 and extends through an upwardly and forwardly inclined opening 34 in the peripheral edge of the retaining ring 12. This opening in the retaining ring acts as a locator or guide for the down-aiming adjustment of the headlamp ball member 2 while the inclined disposition of the opening prevents binding between the parts. At its forward end and just above the lens element 10 of the sealed beam unit, a cam lever 36 is rotatably mounted on the strap 30 for engagement with the lip 14 of the retaining ring. This cam lever includes a neutral lobe position (full line Figure 4) for cooperation with adjustment of the aiming screw 32 to provide a primary aiming means for the ball member 2. This lever also includes any desired number of additional cam lobes which act, upon rotation of the lever, as shown in dotted lines in Figure 4, to provide any desired degree of beam down-aim. The aiming screw 32 is threadedly received within an aiming nut 38, preferably made of nylon, in the usual manner, the nut being secured in place by means of the bracket 40 secured to the housing 4 within the channel 8.

In operation, it will be readily appreciated that the aiming mechanisms 24 and 26 may be adjusted as is the usual practice to initially aim the headlamp assembly. Insofar as the aiming mechanism 26 is concerned, in initially aiming the headlamp the strap 30 and engagement of the cam lever 36 with the retaining ring form an operative connection with the aiming screw 32 to form a primary aiming means. Thereafter, as a trailer is attached to the tractor, or the trailer is loaded, the cam lever 36 may be rotated to allow the ball member 2 to swing forwardly on a vertical longitudinal plane under the influence of spring 20 to provide a predetermined degree of down-aim without disrupting the primary aim which may again be acquired by returning the lever 36 to the neutral position of Figure 4.

Figure 5:
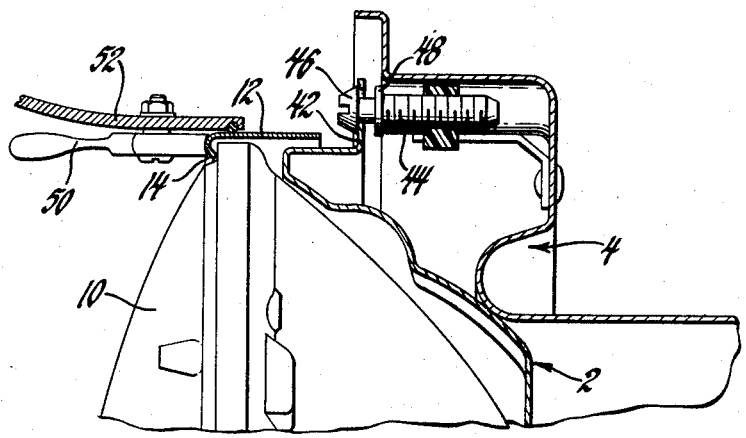
Figures 5, 6 and 7 are views of three additional embodiments of this invention.

Another form of this invention is shown in Figure 5, and includes the usual ball and socket members aforedescribed. However, in this construction the usual slotted mounting ring flange 42 at the vertical axis of the assembly has not been removed, but is adapted for relative axial movement on the aiming screw 44 as limited by the head 46 thereof and an annular shoulder 48 formed thereon. In this embodiment, a rotatable lever 50 having a smooth cam surface is mounted on the interior surface of the usual headlamp door or trim piece 52 for engagement with the radially inwardly directed lip 14 of the retaining ring 12 as before. The distance between the head 46 and annular shoulder 48 of the aiming screw naturally limits the maximum degree of down-aim, the cam lever 50 controlling the degree of down-aim within these limits.

In initially aiming this assembly, the headlamp aiming mechanisms 24 and 26 will be adjusted as aforedescribed. During this operation the mounting ring flange 42 will be abutting the head 46 of the aiming screw as shown. The headlamp will be aimed to a particular degree of down-aim which differs from that initially desired by the amount of down-aim that can be taken up by axial movement of the mounting ring flange 42 into abutting engagement with the annular shoulder 48. Thereafter, the mounting ring and entire ball member 2 can be placed in this position and the cam lever 50 placed in abutting engagement with the retaining ring 12 as aforedescribed. Other alternatives will, of course, be apparent. For example, the cam lever 50 can be designed to accomplish this take-up action.

In operation, the desired degree of down-aim, within the limits imposed by the head and annular shoulder of the aiming screw, may be obtained by rotation of the cam lever, allowing the ball member 2 to tip forwardly in the vertical plane up to a maximum extent determined by abutment of flange 42 with screw head 46.

Figure 6:
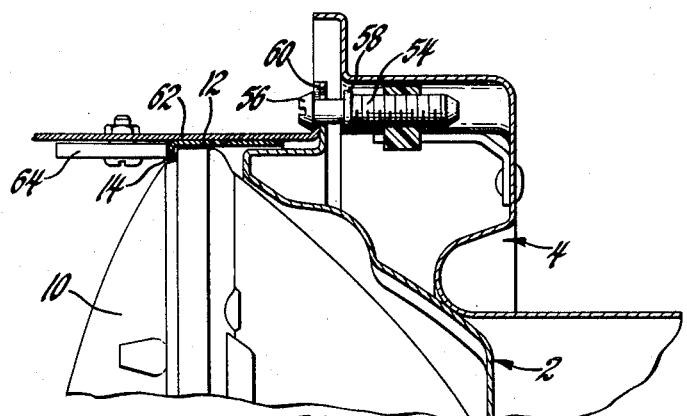

In Figure 6, another form of the invention is disclosed which is similar to that shown in Figure 5 in being adaptable to an assembly in which the mounting ring flange is retained. This embodiment includes an aiming screw 54 having an axially spaced head 56 and shoulder 58 as in the previous embodiment. In this form of the invention, the slotted mounting ring ear or flange 60 again is reciprocably disposed for axial sliding movement within maximum limits defined by the head and shoulder of the aiming screw. A strap or bracket 62 is secured in any suitable way to the head of aiming screw 54 for movement therewith, and extends past the external surface of the retaining ring 12 and rotatably supports a cam lever 64 at its forward end, the cam lever engaging the lip 14 of the retaining ring.

The operation of this form of the invention is, in effect, a combination of the two embodiments aforedescribed. However, as compared to the embodiment in Figure 5, the lever 64 and strap member 62 are operatively directly connected to the aiming screw 54 to form a primary aiming means as the latter is adjusted within the aiming nut. There is no need for locating the cam lever against the retaining ring after the ball member 2 has been initially adjusted.

Figure 7:
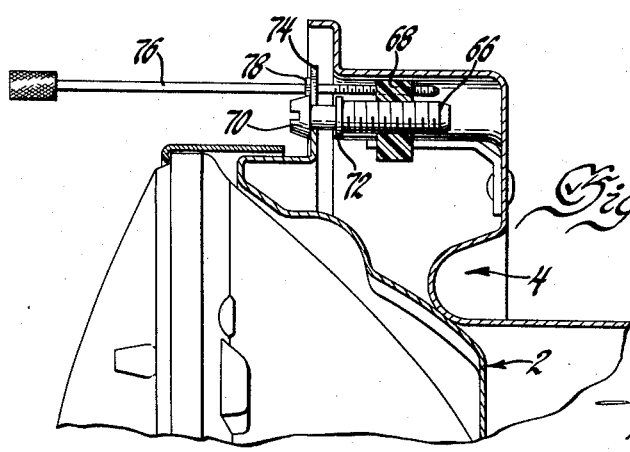

Another embodiment of this invention is disclosed in Figure 7, and includes an aiming screw 66 threadably adjustably secured in an aiming nut 68 on the vertical axis of the headlamp assembly. The aiming screw has an axially spaced head 70 and annular shoulder 72 between which the slotted mounting ring flange 74 may reciprocate. In this form of the invention, a secondary aiming screw 76 having a knurled knob for grasping by the vehicle operator is slidably embraced by another slotted portion of the mounting ring flange 74 adjacent the aiming screw 66 and has a threaded portion engaging the aiming nut 68. The mounting ring flange is slotted at its connection to secondary screw 76 so as to be able to move relative to the latter to the right of the shoulder 78 formed thereon as shown in Figure 7.

In initially adjusting this assembly, the slotted mounting ring flange 74 will be in abutting engagement with the head 70 of the aiming screw 66 as the latter moves into the aiming nut, the flange 74 being movable to the right in Figure 7 away from shoulder 78. The headlamp is adjusted to a down-aim which differs from the initially desired aim by an amount equal to that obtainable by moving the mounting ring flange into abutting engagement with the primary aiming screw shoulder 72. Thereafter, the secondary aiming means 76 will be threadably adjusted into the aiming nut so that the annular shoulder 73 will pick up the mounting ring flange 74 and carry it into abutting engagement with the annular shoulder 72. Thereafter, the secondary aiming screw 76 may be backed off to allow the mounting ring, and entire ball member 2, to tilt forwardly in the vertical longitudinal plane until the mounting ring flange 74 engages the aiming screw head 70.

It will be readily apparent that in each of the embodiments disclosed the secondary aiming means will give the required degree of down-aim without disturbing the setting of the primary aiming means which may be utilized to return to the initial aim. Furthermore, although this invention is particularly useful in down-aiming lamps, the same principles can be utilized to aim a lamp in any desired direction.

The preferred embodiment of this invention as disclosed in Figures 1 to 4 includes a cam lever having lobes designed to give a predetermined degree of lamp down-aim. In the embodiments shown in Figures 5 to 7, the secondary aiming means is disclosed as relying on the degree of tilt obtainable in the ball member 2 as limited by abutment of the respective slotted mounting ring flanges with the spaced stop portions of the primary aiming means. However, it will be readily apparent that suitable indicia can be located adjacent the secondary operating means in these other embodiments to give the desired degree of down-aim within the maximum limits imposed by the aforementioned stop means.

Having disclosed a preferred and three additional forms of our invention, it is to be understood that the various combinations of the arrangements disclosed will occur to those skilled in the art. Therefore, this invention is not to be limited by the forms thereof shown for illustration, but only by the scope of the claims which are appended hereto.

We claim:

1. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, an aiming screw adjustably threadably connected to said nut, means connecting said ball member to said screw for movement therewith or independently thereof, and secondary aiming means operable independently of said screw to adjust said ball member independently of said screw, said secondary means comprising a rotatable cam lever engaging said ball member.

2. In combination, an adjustable headlamp assembly of the type comprising a housing having a socket member and a ball member adjustably mounted therein, said ball member comprising a lighting unit sub-assembly including a lens, reflector and lighting filament fixedly mounted relative to said reflector; means yieldingly urging said ball member into engagement with said socket member, adjustable aiming means connecting said ball member and socket member to permit initial aiming of the lighting unit, said means including a rotatable cam lever engaging said ball member, said lever being rotatable to adjust the aim of said lighting unit a predetermined fixed amount irrespective of the position of said primary adjustable means.

3. In combination, an adjustable headlamp assembly of the type comprising, a housing having a socket member and a ball member adjustably mounted therein, said ball member comprising a lighting unit sub-assembly including a lens, reflector and lighting filament fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, an aiming screw adjustably threadably connected to said nut, means connected to said primary aiming screw for movement therewith relative to said aiming nut, and a cam lever rotatably mounted on said connecting means and engaging said ball member.

4. In combination, an adjustable headlamp assembly of the type comprising, a housing having a socket member and a ball member adjustably mounted therein, said ball member comprising a lighting unit sub-assembly including a lens, reflector and lighting filament fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, an aiming screw adjustably threadably connected to said nut, and a cam lever operatively connected to said primary aiming screw for movement therewith relative to said aiming nut and engaging said ball member.

5. In combination, an adjustable headlamp assembly of the type comprising a supporting means including a socket member, and a ball member adjustably mounted therein, said ball member comprising a lighting unit having a reflector, lens and light source fixed within the reflector; means yieldingly urging said ball member into engagement with said socket member, aiming means operatively connected between said ball and socket members at spaced points from said yieldable means and operative to variably adjust the position of said ball member in said socket member, at least one of said aiming means being located on the vertical axis of said ball member to adjust the beam of the lighting unit thereof in a vertical plane, said last named means including an aiming screw adjustably threadably secured in a nut secured to said supporting means, a strap fixedly mounted on said aiming screw and extending to a point above the lens of said lighting unit, and manually selectively operable cam means rotatably mounted on said strap and engaging said ball member.

6. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut and having axially spaced stops formed thereon, said ball member being directly connected to said primary aiming screw for reciprocation therealong between maximum limits defined by said stops, and adjustable secondary aiming means operatively connected to said member and operable to locate the latter between said stops.

7. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement wtih said socket member, means for adjusting the aim of the lighting unit of said ball member by adjusting the position of the latter within said socket member; said means comprising an aiming nut mounted on said housing, a primary aiming screw adjustably threadably connected to said nut and having axially spaced stops formed thereon, said ball member being directly connected to said primary aiming screw for reciprocation therealong between maximum limits defined by said stops, and selectively actuable secondary aiming means operatively connected to said ball member for adjustment of the latter within said socket member within said limits without disrupting the setting of said primary aiming screw.

8. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut and having an axially spaced head and shoulder formed thereon, said ball member being connected to said primary aiming screw for relative movement therealong between maximum limits defined by said head and shoulder, and selectively actuable secondary aiming means operatively connected to said ball member for adjustment of the latter within said socket member within said limits without disrupting the setting of said primary aiming screw.

9. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut, said ball member being connected for relative axial movement on said primary aiming screw between fixed stops formed on the latter, and secondary aiming means for adjusting said ball member within said socket member irrespective of the setting of said primary aiming screw, said secondary aiming means comprising a rotatable cam lever operatively supported on said housing and engaging said ball member for tilting the latter within maximum limits defined by said stops.

10. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut and having axially spaced stops formed thereon, said ball member being connected to said primary aiming screw for movement relative thereto between maximum limits defined by said stops, and secondary aiming means forming an operative connection between said primary aiming screw and ball member to locate the latter between said stops.

11. In combination, an adjustable headlamp assembly of the type comprising a supporting means including a socket member and a ball member adjustably mounted therein; said ball member comprising a lighting unit having a reflector, lens and light source fixed within the reflector, and a mounting therefor comprising a cup-shaped member extending over the reflector and having a spherical seating surface for mounting in said socket member, a ring overlapping the front edge of the unit, means for securing the ring to the cup-shaped member and clamping the unit between them to form a sub-assembly, means yieldingly urging said ball member into engagement with said socket member, aiming means operatively connected between said ball and socket members at spaced points from said yieldable means and operative to variably adjust the position of said ball member in said socket member, at least one of said aiming means being located on the vertical axis of said ball member to adjust the beam of the lighting unit thereof in a vertical plane, said last named means including an aiming screw adjustably threadably secured in a nut secured to said supporting means, a strap fixedly mounted on said aiming screw and extending through said ring to a point above the lens of said lighting unit, and manually selectively operable cam means rotatably mounted on said strap and engaging said ring.

12. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut, a strap connected to said aiming screw for movement therewith and extending forwardly of the latter to a point adjacent the forward face of said ball member, a cam lever rotatably mounted on said strap and engaging said ball member, said ball member being connected to said primary aiming screw for relative axial movement therewith within maximum limits defined by stops formed on the latter.

13. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut, said screw having an axially spaced head and shoulder formed thereon between which said ball member is operatively connected for relative sliding movement, a secondary aiming means for adjustment of said ball member within said socket member within limits imposed by abutting engagement of said ball member with said head and shoulder, said secondary means comprising a rotatable screw threadably received within said aiming nut and being connected to said ball member, whereby said secondary aiming screw may be rotated to reciprocate the connection of said ball member to said primary aiming screw between the stops formed on the latter.

14. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut, said screw having an axially spaced head and shoulder formed thereon between which said ball member is operatively connected for relative sliding movement, a secondary aiming means for adjustment of said ball member within said socket member within limits imposed by abutting engagement of said ball member with said head and shoulder, said secondary means comprising a rotatable screw threadably received within said aiming nut and being connected to said ball member by a lost motion connection whereby said primary aiming screw may be actuated to initially aim said ball member independently of said secondary means.

15. In combination, an adjustable headlamp assembly of the type comprising a housing having a socket member and a ball member adjustably mounted therein, said ball member comprising a lighting unit sub-assembly including a lens, reflector and light source fixedly mounted relative to said reflector; means yieldingly urging said ball member into engagement with said socket member, means for adjusting the aim of the lighting unit of said ball member by adjusting the position of the latter within said socket member; said means comprising an aiming nut mounted on said housing, a primary aiming screw adjustably threadably connected to said nut, said screw having an axially spaced head and shoulder formed thereon between which said ball member is operatively connected for relative sliding movement, a secondary aiming means for adjustment of said ball member within said socket member within limits imposed by abutting engagement of said ball member with said head and shoulder, said secondary means comprising a rotatable screw threadably received within said aiming nut and being connected to said ball member by a lost motion connection, whereby said primary aiming screw may be moved in at least one direction independently of said secondary means to initially aim said unit, and said secondary means may be actuated to aim said unit irrespective of the setting of said primary aiming screw.

References Cited in the file of this patent
UNITED STATES PATENTS

| | | |
|---|---|---|
| Re. 14,453 | MacDonald | Mar. 26, 1918 |
| 1,448,691 | Hunt | Mar. 13, 1923 |
| 2,504,327 | Gross | Apr. 18, 1950 |
| 2,605,388 | Theiser | July 29, 1952 |
| 2,733,335 | Falge | Jan. 31, 1956 |